(12) United States Patent
Toukura et al.

(10) Patent No.: US 6,418,367 B1
(45) Date of Patent: Jul. 9, 2002

(54) ENGINE TRANSMISSION CONTROL SYSTEM

(75) Inventors: Nobusuke Toukura; Yoshinori Tanaka; Yoshinori Iwasaki, all of Kanagawa; Tomoya Kimura, Morisaki, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/669,738

(22) Filed: Sep. 26, 2000

(30) Foreign Application Priority Data

| Oct. 8, 1999 | (JP) | ............................. 11-288318 |
| Feb. 15, 2000 | (JP) | ......................... 2000-036270 |

(51) Int. Cl.[7] ........................... F16H 61/10; B60K 41/00
(52) U.S. Cl. ............................ 701/54; 701/65; 701/208
(58) Field of Search ............................ 701/54, 65, 208; 477/97

(56) References Cited

U.S. PATENT DOCUMENTS

| 5,515,283 | A | * | 5/1996 | Desai et al. ................. 364/443 |
| 5,716,301 | A | * | 2/1998 | Wild et al. ..................... 477/97 |
| 5,832,400 | A | * | 11/1998 | Takahashi et al. ............. 701/53 |
| 5,931,886 | A | * | 8/1999 | Moroto et al. ................. 701/54 |
| 6,070,118 | A | * | 5/2000 | Ohta et al. ..................... 701/65 |
| 6,085,137 | A | * | 7/2000 | Aruga et al. ................... 701/51 |
| 6,098,005 | A | * | 8/2000 | Tsukamoto et al. ........... 701/65 |
| 6,174,262 | B1 | * | 1/2001 | Ohta et al. ..................... 477/97 |
| 6,278,928 | B1 | * | 8/2001 | Aruga et al. ................... 701/65 |

FOREIGN PATENT DOCUMENTS

| JP | 7-172217 | 7/1995 |
| JP | 10-141491 | 5/1998 |
| JP | 11-257113 | 9/1999 |

* cited by examiner

Primary Examiner—Michael J. Zanelli
(74) Attorney, Agent, or Firm—Foley & Lardner

(57) ABSTRACT

A control system for an engine-CVT powertrain controls the target driving force during traveling on a ramp to meet operator power demand and/or the target input speed of the CVT to accomplish the ramp target window during traveling on the ramp to meet operator deceleration command.

18 Claims, 15 Drawing Sheets

ENGINE TRANSMISSION CONTROL SYSTEM

BACKGROUND OF THE INVENTION

The present invention relates to an engine transmission control system.

A powertrain has an engine and a transmission. A control system for a powertrain determines the target speed ratio for a transmission and the target engine torque for an engine from various input data received from the vehicle and operator. Continuously variable transmissions (CVT's) are transmissions that change ratio continuously, not in discrete intervals. The continuous nature of CVT's gives them an infinite number of gear ratios, making them very attractive for automotive uses.

Previously, there have been various methods to control the speed ratio of the transmission and the engine torque of the engine. The most straightforward way is to define a routine target driving force in response to various input data from vehicle and operator, and define a target engine torque and a target speed ratio to achieve the target driving force, and then adjust an operation parameter of the engine and the control valve of the transmission in manners to achieve the target engine torque and the target speed ratio.

During traveling on a ramp between a highway and a city roadway, the routine driving force cannot meet operator demand because the traffic environment on the ramp where there are no crossing and pedestrians prompts the operator to demand increased driving force.

JP-A 10-141491 discloses a method of controlling the speed ratio of the transmission during traveling on a ramp from a highway to a city roadway. The method moves the upper limit of speed ratios of the transmission in response to various input data from vehicle and operator during traveling on the ramp. According to this proposal, during traveling on the ramp, the upper limit is moved in a shift down direction upon releasing an accelerator pedal and depressing a brake pedal. The upper limit is moved back in a shift up direction upon subsequently depressing the accelerator pedal. In this case, the driving force demanded by the operator cannot be achieved because there is the tendency that the subsequent depression of the accelerator causes the transmission to shift up.

Accordingly, a need remains to improve a control system in such a direction as to meet operator demand during traveling on a ramp that connects a highway and a city roadway.

SUMMARY OF THE INVENTION

An object of the present invention is to provide an engine transmission control system, which has satisfied the above-mentioned need.

In accordance with one aspect of the present invention, there is provided a control system for an engine-transmission powertrain of a vehicle having a transmission to establish various speed ratios between input and output shafts of the transmission, an accelerator pedal with various positions including a released position, and an engine with various output torque levels, the control system comprising:

- a vehicle navigation system including a map database with map information including kinds of roadways, said vehicle navigation system being operable to provide information as to a current position of the vehicle and information as to a kind of roadway which the current vehicle position is on;
- a ramp detection unit operatively connected with said vehicle navigation system to determine whether or not the vehicle is on a ramp;
- an accelerator pedal sensor operatively connected to the accelerator pedal to detect operator demand by detecting current position of the accelerator pedal; and
- a controller, which receives output signals of said ramp detection unit and said accelerator pedal sensor, generating a command upon determination by said ramp detection unit that the vehicle is on the ramp and applying said command to the engine-transmission powertrain, affecting control of the engine-transmission powertrain to meet the detected operator demand.

In accordance with another preferred implementation of the present invention, the target window for vehicle acceleration is set during traveling on a ramp to meet operator deceleration demand.

BRIEF DESCRIPTION OF THE DRAWINGS

Further objects and advantages of the invention will be apparent from reading of the following description in conjunction with the accompanying drawings.

DESCRIPTION OF THE PREFERRED EMBODIMENTS

Figure 1:
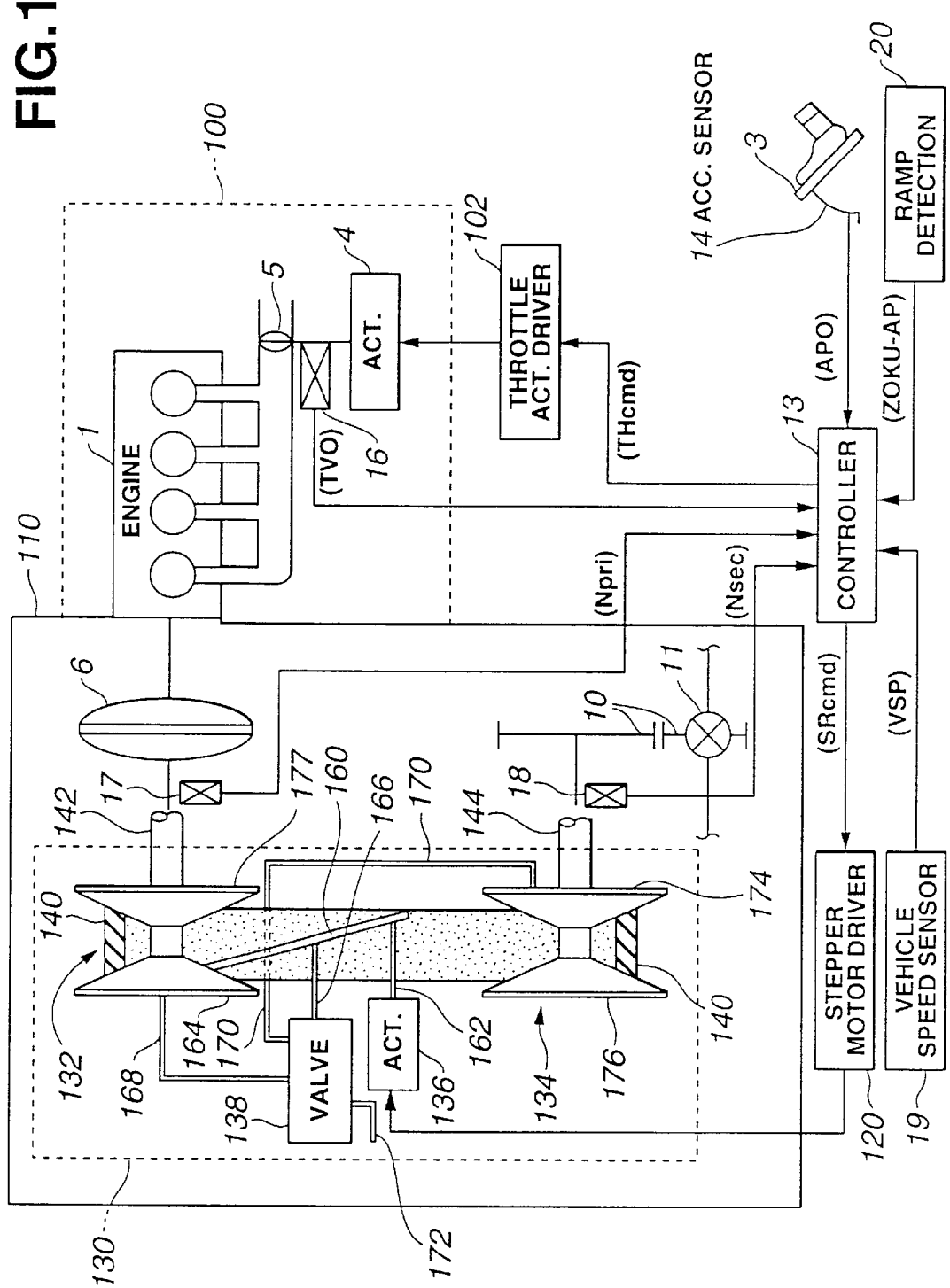
FIG. 1 is a hardware drawing of the engine transmission control system.
Figure 2:
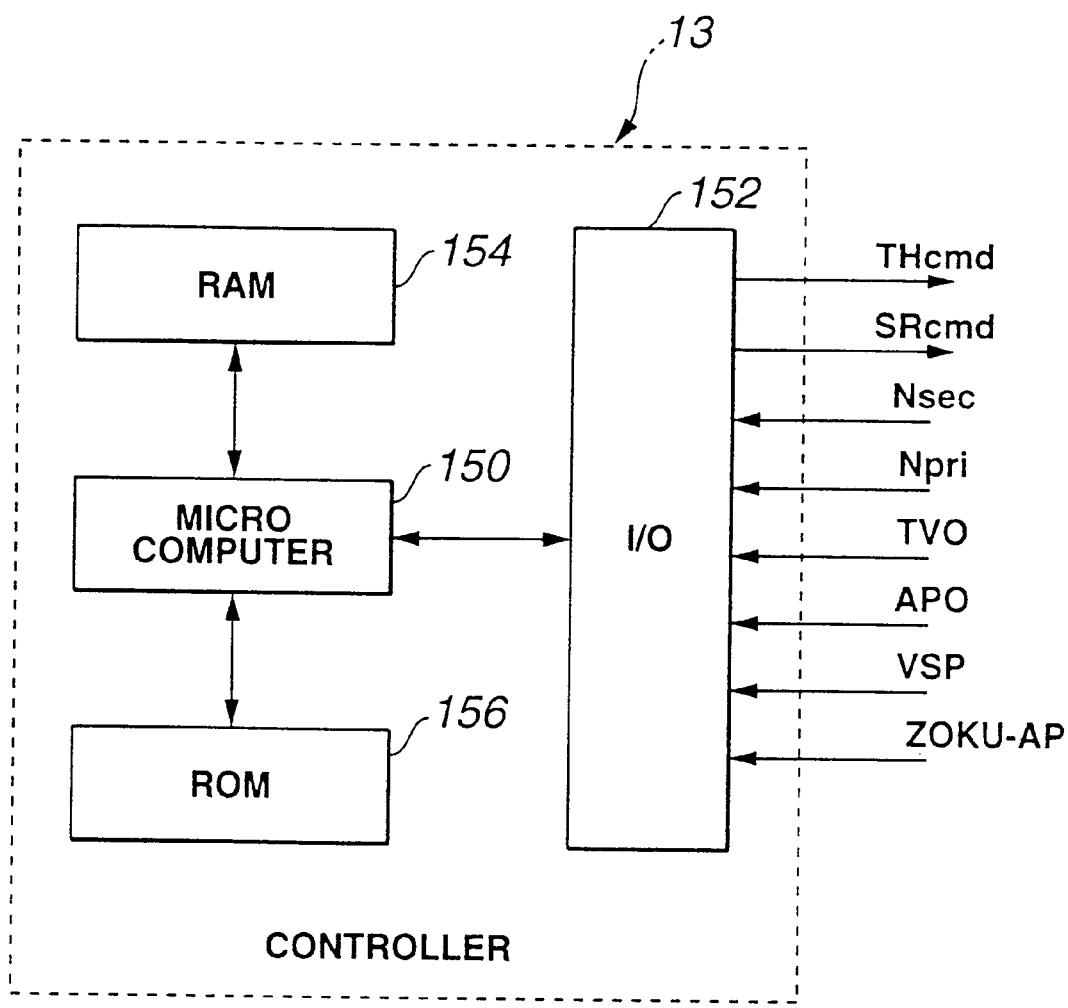
FIG. 2 is a block diagram of a controller.

Referring to FIG. 1, a controller 13 controls a continuously variable unit (CVU) 130 of a transmission in the form of CVT 110 and an engine power plant 100. As shown in FIG. 2, controller 13 includes microcomputer 150, input/output control unit 152, random access memory 154 and read only memory 156. Actuator drivers 102 and 120 are connected to controller 13. Engine power plant 100 includes throttle actuator 4, throttle 5, throttle position sensor 16, and engine 1. CVT 110 includes input pulley 132, output pulley 134, pressure control valve 138, ratio actuator 136, V-belt 140, and input and output shafts 142 and 144. The engine power is transferred to input shaft 142 through hydraulic torque transmission unit 6 in the form of hydraulic coupling or converter. Output shaft 144 transfers the engine power to final drive, which moves road wheels of vehicle. The final drive includes gear train 10 and differential 11. For reverse travel of the vehicle, a ratio planetary gear set may be provided before input shaft 142 or after output shaft 144. It will be understood that the present invention is not limited to the use of CVT's with pulley/V-belt power transfer. The present invention is operational with any other type of CVT, including CVT's with friction disc/cone power transfer. It will also be understood that the present invention is operational with any type of automatic transmission that changes speed ratio in discrete interval, including transmissions with planetary gear arrangement.

In controller 13, microcomputer 150 controls input/output control unit 152, RAM 154 and ROM 156. Controller 13 is provided for carrying out control to generate a throttle position command THcmd as a function of the desired or target throttle angle TVO* and a speed ratio command SRcmd as a function of the desired or target operating parameter including the target speed ratio i* or the target input speed tNin. Throttle position command THcmd is output to throttle actuator driver 102 (preferably a stepper motor driver). Speed ratio command SRcmd is output to speed ratio actuator driver 120 (preferably a stepper motor driver).

In engine power plant 100, throttle 5 is mechanically linked to actuator 4 preferably of the stepper motor type so as to rotate with the actuator in response to a current command generated by throttle actuator driver 102 controlled by throttle position command THcmd issued by controller 13. Throttle 5 controls torque and power output of engine 1. The throttle position or angle TVO is detected by throttle angle sensor 1 6 and fed to controller 13. The output power of engine 1 is transmitted through the engine output shaft, which is connected through hydraulic torque transmitting unit 6 to input shaft 142.

In CVT 110, speed ratio actuator 136 including a motor preferably of the stepper motor type receives a current command generated by stepper motor driver 120 controlled by speed ratio command SRcmd issued by controller 13. In response to the command, ratio actuator 136 moves a lever 160, connected to the actuator shaft 162, to control the speed ratio of the CVT 110. Lever 60 is connected to actuator 136 at one end and to a positionable pulley half 164 of input pulley 132. At a point between the two ends, lever 160 is pivotally connected to the valve rod 166. This arrangement provides position feedback of the pulley to the valve. As actuator 136 moves lever 160, valve 138. in response to the movement of the valve shaft 166, alters the hydraulic pressure in lines 168 and 170. Hydraulic pressure is provided to valve 138 through line 172, which is connected to a pressure source (not shown). As the pressure in lines 168 and 170 is altered, pulley halves 164 and 174 move, changing the speed ratio of CVT 110 at a rate dependent upon the speed of the movement of the pulley halves. As pulley half 164 moves, lever 160 moves repositioning valve shaft 166, providing a means for valve 138 to stop positionable pulley haves 164 and 174 from moving. Input pulley 132 has stationary pulley half 177 in face-to-face relation to pulley half 164. Output pulley 134 has stationary pulley half 176 in face-to-face relation to pulley half 174.

The ratio rate of the CVT is controlled by controlling the speed of the movement of lever 160 by actuator 136. The faster actuator 136 moves lever 160, the faster the ratio of the speed ratio of input and output shafts 142 and 144 changes.

The speed of input shaft 142 is sensed by input speed sensor 17 and fed to controller 13 as a signal indicative of input shaft speed Npri. The speed of output shaft 144 is sensed by output speed sensor 18 and fed to controller 13 as a signal indicative of output shaft speed Nsec. The vehicle operator manually depresses an accelerator pedal 3 away from a rest position. The degree of depression, i.e., accelerator pedal angle, is sensed by accelerator sensor 14 and fed to controller 13 as a signal indicative of accelerator pedal angle APO. The traveling speed of the vehicle is sensed by vehicle speed sensor 19 and fed to controller 13 as a signal indicative of vehicle speed VSP.

In addition to data from the vehicle including TVO, Npri, Nsec and VSP and data from the vehicle operator including APO, control 13 inputs environmental data such as information as to what kind of roadway the vehicle is traveling on. Specifically, a ramp detection unit 20 generates a two-level signal ZOKU-AP indicative of whether or not the current roadway is a ramp.

Figure 3:
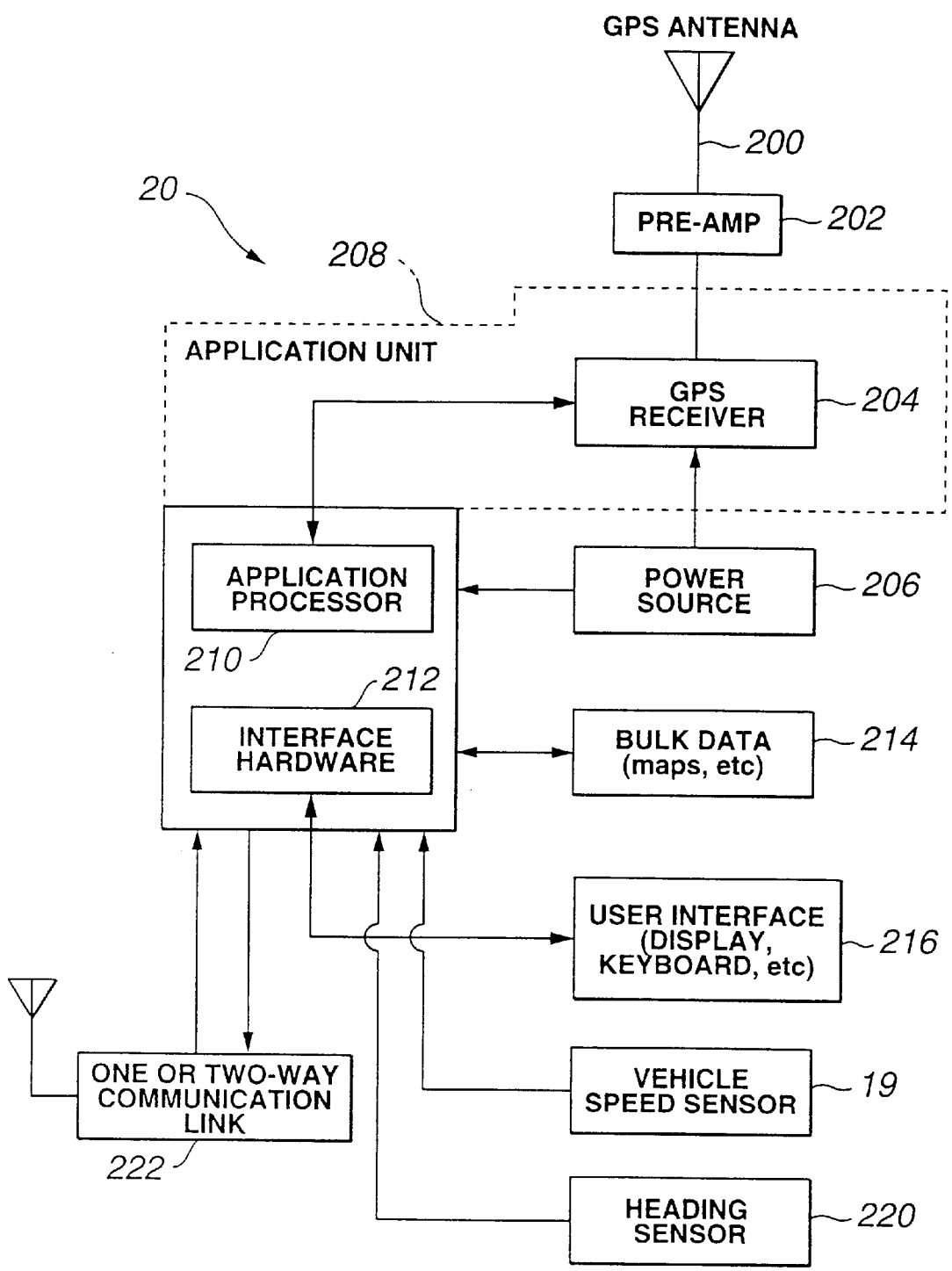
FIG. 3 is a block diagram of a vehicle navigation system providing data used for the ramp detection.
Figure 5:
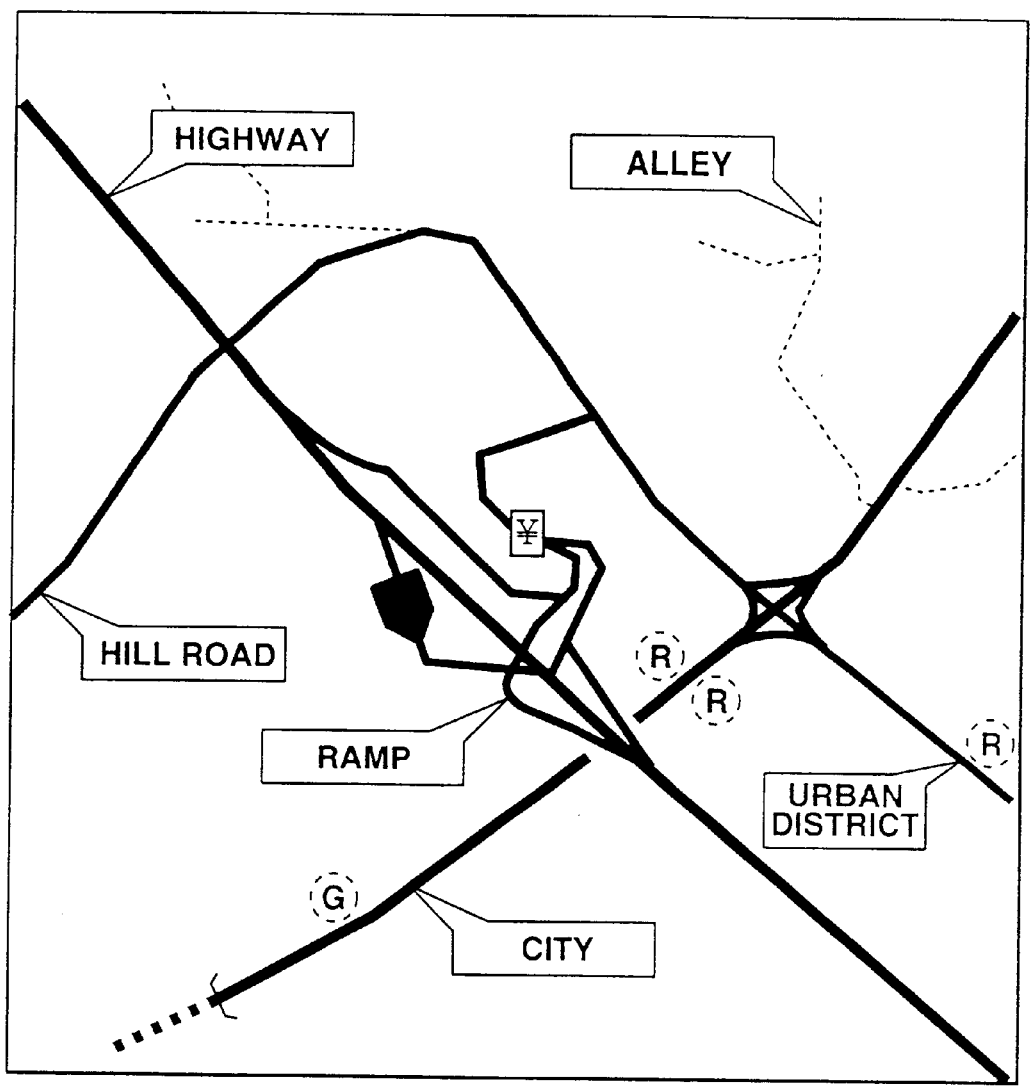
FIG. 5 is an image on a display of the vehicle navigation system.

Referring to FIG. 3, a portion of vehicle navigation system constitutes ramp detection unit 20. The navigation system uses a GPS antenna 200 to receive GPS (Global Positioning System) signals. GPS antenna 200 is connected to a preamplifier 202 to amplify the GPS signals. Preamplifier 202 is connected to GPS receiver 204, which is powered by power source 206 for the vehicle navigation system. GPS receiver 204 provides GPS measurements to an application unit 208. Application unit 208 includes application processing circuitry 210, such as processor, memory, busses, application software and related circuitry, and interface hardware 212. Speed sensor 218 provides vehicle speed VSP signal to application unit 208. A heading sensor 220, such as a gyro, provides information to application unit 208. One or two-way data or communication link 222 communicates information with application unit 208. A map database 214 stores map information to application unit 208. FIG. 5 illustrates a portion of the map information stored in map database 214. The vehicle navigation system relies on information provided by GPS receiver 204, vehicle speed sensor 218, heading sensor 220 and one or two-way communication link 222 to propagate information as to what kind of roadway the vehicle is traveling on as well as vehicle position.

Figure 4:
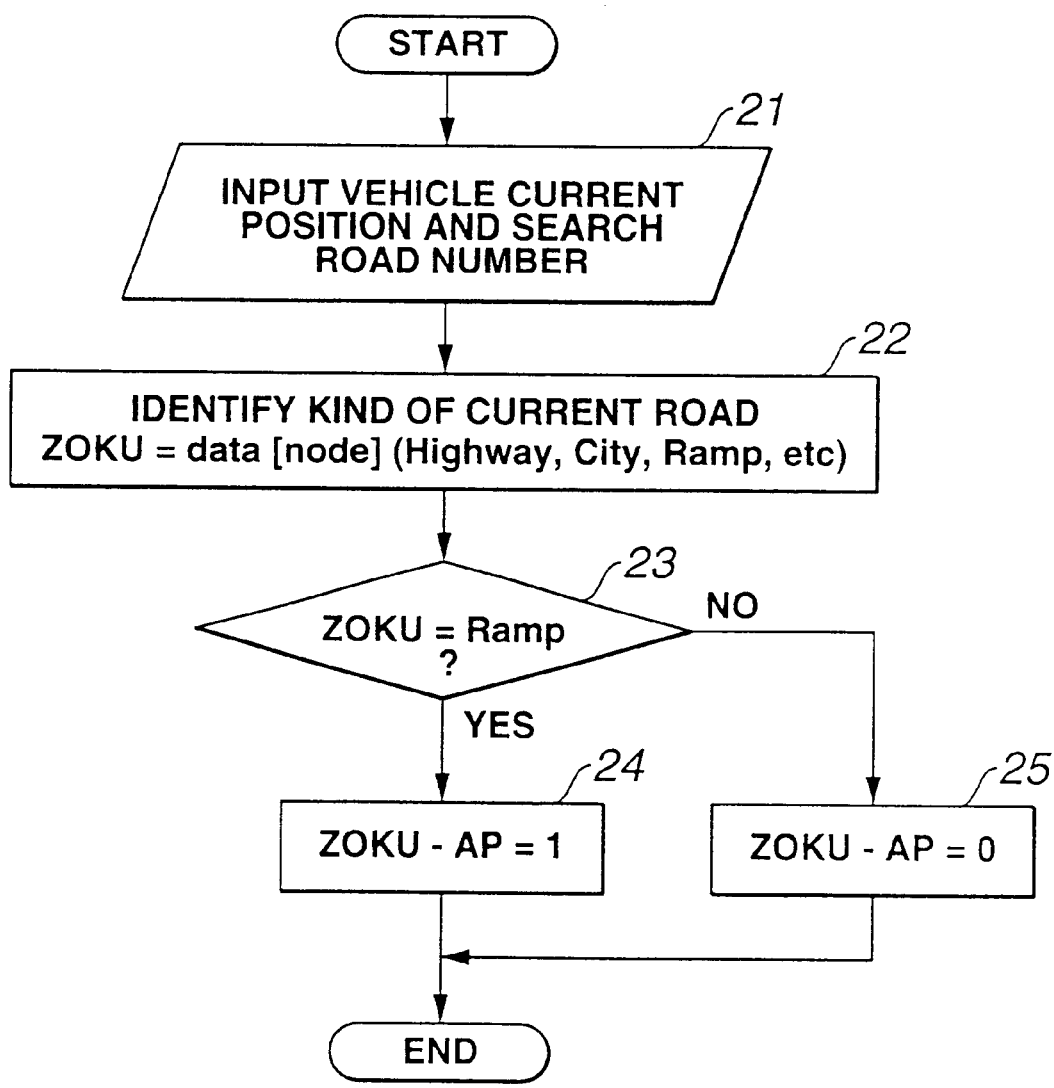
FIG. 4 is a flow chart of a control routine to determine whether or not the vehicle is on a ramp.

The flow chart shown in FIG. 4 illustrates a control routine to identify a roadway the vehicle is traveling on.

In FIG. 4, at step 21, application unit 208 inputs vehicle current position and refers to map database covering an area in the vicinity of the current position as illustrated in FIG. 5 to search a road number assigned to a roadway which the current position of the vehicle belongs to.

At step 22, application unit 208 refers to database using the searched road number to determine as to which one of "Highway", "City", "Ramp", and etc the classification, ZOKU =data [node], of the current roadway falls in.

At the next interrogation step 23, application unit 208 determines whether or not classification ZOKU is RAMP. If this is the case, the routine proceeds to step 24. If ZOKU is not RAMP, the routine proceeds to step 25.

At step 24, application unit 208 sets a ramp flag ZOKU-AP equal to 1 (one). At step 25, application unit 208 resets flag ZOKU-AP equal to 0 (zero).

Figure 6:
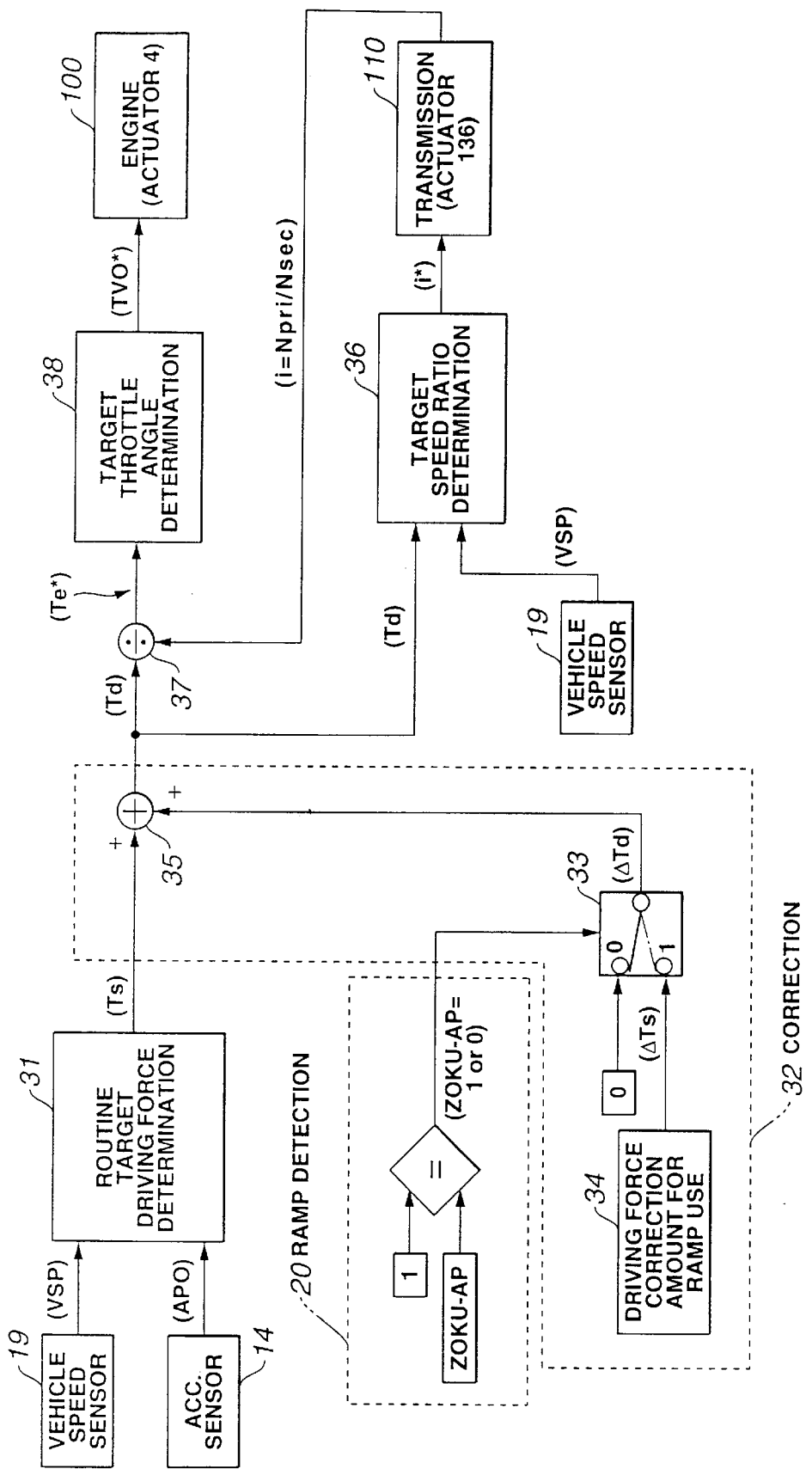
FIG. 6 is a control diagram showing control of the engine torque through throttle control and control of the CVT through speed ratio control to achieve a target driving force that has been given by correcting a routine target driving force upon determination that the vehicle is traveling on the ramp.
Figure 11:
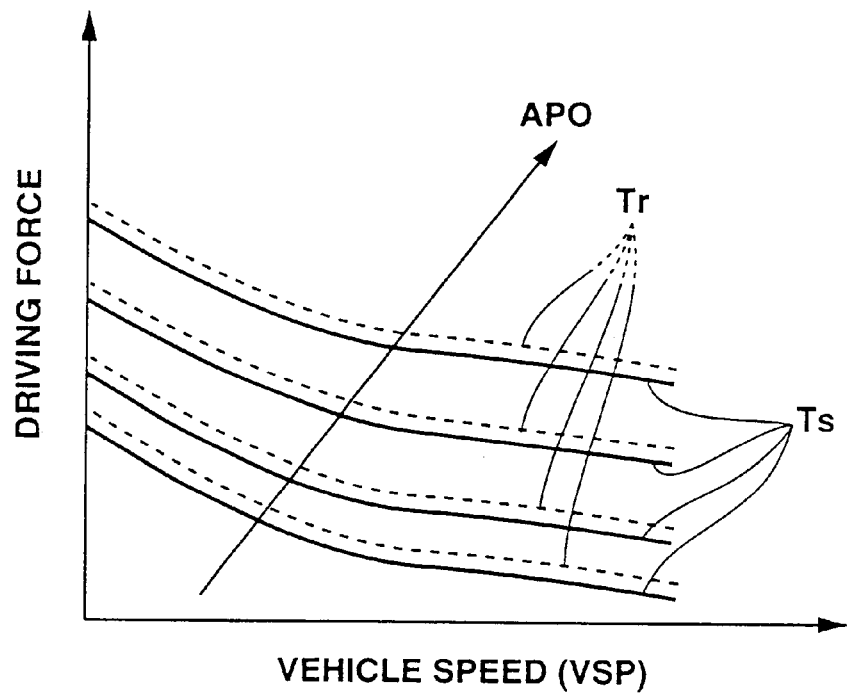
FIG. 11 is a graphical illustration of the set of target values of driving force for traveling on a ramp (fully drawn line) as compared to a set of target values of routine driving force (dotted line).

A first preferred implementation of the present invention can be understood with reference to the controls diagram in FIG. 6. The accelerator pedal angle APO and the vehicle speed VSP are used as inputs to a routine target driving force determination (RTDFD) generator 31. RTDFD 31 may be as simple as a look-up table in the controller memory. Fully drawn lines in FIG. 11 illustrate the look-up table. RTDFD 31 outputs a driving force command Ts. In this implementation, driving force command Ts represents an operation parameter indicative of a required minimum driving force against current measures of APO and VSP, namely "routine target driving force."

Driving force command Ts is fed, as input, to a summation point 35 of a correction filter 32. Also fed, as the other input, to summation point 35 is an output signal ΔTd of a changeover point 33. A driving force correction amount for ramp use ΔTs, which is generated by a driving force correction amount for ramp use (DFCAFRU) generator 34, is fed, as input, to a "1" input terminal of changeover point 33. A "0" input terminal of changeover point 33 is maintained at a 0 (zero) level. Ramp flag ZOKU-AP of ramp detection unit 20 is applied to a bias terminal of changeover point 33. When ZOKU-AP is equal to 0, "0" input terminal is connected to an output terminal so that the output ΔTd of changeover point 33 is maintained at zero level. Under this condition, driving force command Ts fed to correction filter 32 is not corrected and set as a final driving force command Td. When ZOKU-AP is equal to 1, "1" input terminal is connected to the output terminal so that the output ΔTd of changeover point 33 is maintained as high as ΔTs. Under this condition, driving force command Ts fed to correction filter 32 is increased byΔTs and Ts as corrected is set as final driving force command Td.

Figure 12:
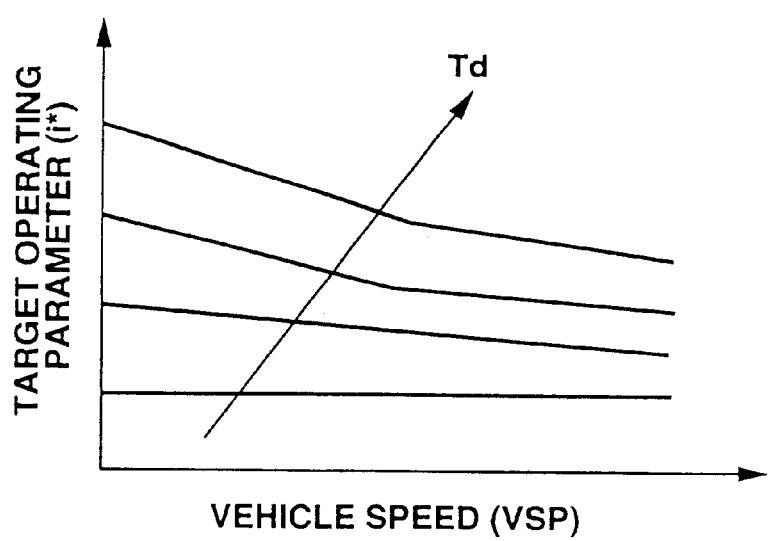
FIG. 12 is a CVT map illustrating how target operating parameter (target speed ratio in this example) is determined against input data of traveling speed of the vehicle and the target driving force.

Final driving force command Td is fed, as input, to a target speed ratio determination (TSRD) generator 36, which generates a target value of operating parameter indicative of speed ratio, i.e., a target speed ratio i* in this example. Vehicle speed VSP from sensor 19 is fed, as other input, to TSRD 36. TSRD 36 may include a look-up table in the controller memory. FIG. 12 illustrates a map, which may be stored in the controller memory. This map contains data experimentally determined and defines the most appropriate speed ratio (i*) to accomplish a given driving force (Td) with the least fuel consumption at a given vehicle speed (VSP). Thus, TSRD 36 can give target speed ratio i* against a given combination of Td and VSP by performing a table look-up operation of the FIG. 12 map.

TSRD 36 may depend on algorithm proposed in JP-A 11-257113, which is incorporated herein by reference in its entirety, to give target speed ratio i*. According to this proposed algorithm, TSRD 36 determines a required horsepower by calculating the product of target driving force Td and rotational speed of axle that is derived from vehicle speed VSP. Using the calculated horsepower, performance curves of engine 1 are retrieved to find a set of values of engine output torque and engine speed, which can achieve the calculated horsepower at the minimum fuel consumption. This engine speed is divided by transmission output shaft speed Nsec to give target speed ratio i*.

Target speed ratio i* is fed to a comparison block, not shown, which compares the target speed ratio with actual speed ratio i (=Npri/Nsec) to provide an error signal. The error signal is fed to a speed ratio control loop, which may be a simple PID controller, but is not so limited. The speed ratio control loop controls the speed ratio of CVT 110 by outputting speed ratio command SRcmd (see FIG. 1) to stepper motor driver 120 for actuator 136 of transmission 110.

Final target driving force command Td is fed to a divider 37. Actual speed ratio i (i =Npri/Nsec) is fed also to divider 37. Divider 37 calculates Td/i to give a target engine torque Te* indicative of a target value of output torque of engine 1. Target engine torque Te* is fed, as input, to a target throttle angle determination (TTAD) generator 38. TTAD can give a target throttle angle TVO* to bring actual engine output torque into target engine torque Te*.

Target throttle angle TVO* is fed to a comparison block, not shown, which compares target throttle angle TVO* with actual throttle angle TvO from throttle angle sensor 16 to provide an error signal The error signal is fed to a speed ratio control loop, which may be a simple PID controller, but is not so limited. The speed ratio control loop controls the speed ratio of CVT 110 by outputting speed ratio command SRcmd (see FIG. 1) to stepper motor driver 120 for actuator 136 of transmission 110.

Operation of engine and transmission on target throttle angle TVO* in combination with target speed ratio i* has made it possible to accomplish the minimum fuel consumption as well as target driving force Td.

In this embodiment, CVT 2 is used as automatic transmission. As mentioned before, the present invention is not limited to this and operable with an automatic transmission that changes speed ratio in discrete intervals. In this case, the nearest one of the available speed ratios approximates the target speed ratio. This speed ratio control can provide fairly good fuel economy.

In this embodiment, throttle angle TVO is altered to regulate the engine output torque. In addition to or in substitution for this throttle angle TvO alteration, fuel injection quantity of engine 2 and/or ignition timing may be altered.

The preceding description on FIG. 6 clearly shows that driving force correction amount ΔTs is constant and added, as A Td, to routine driving force command Ts when ramp flag ZOKU-AP is equal to 1. Accordingly, driving force high enough to meet operator demand is provided during travel on a ramp.

In this embodiment, ΔTs is constant, making it easy for the system to adapt to different kinds of vehicle by changing the magnitude ofΔTs only.

In this embodiment, final driving force command Td is always accomplished at an operation point where the fuel consumption is minimum, thus providing additional merit of good fuel economy.

Figure 7:
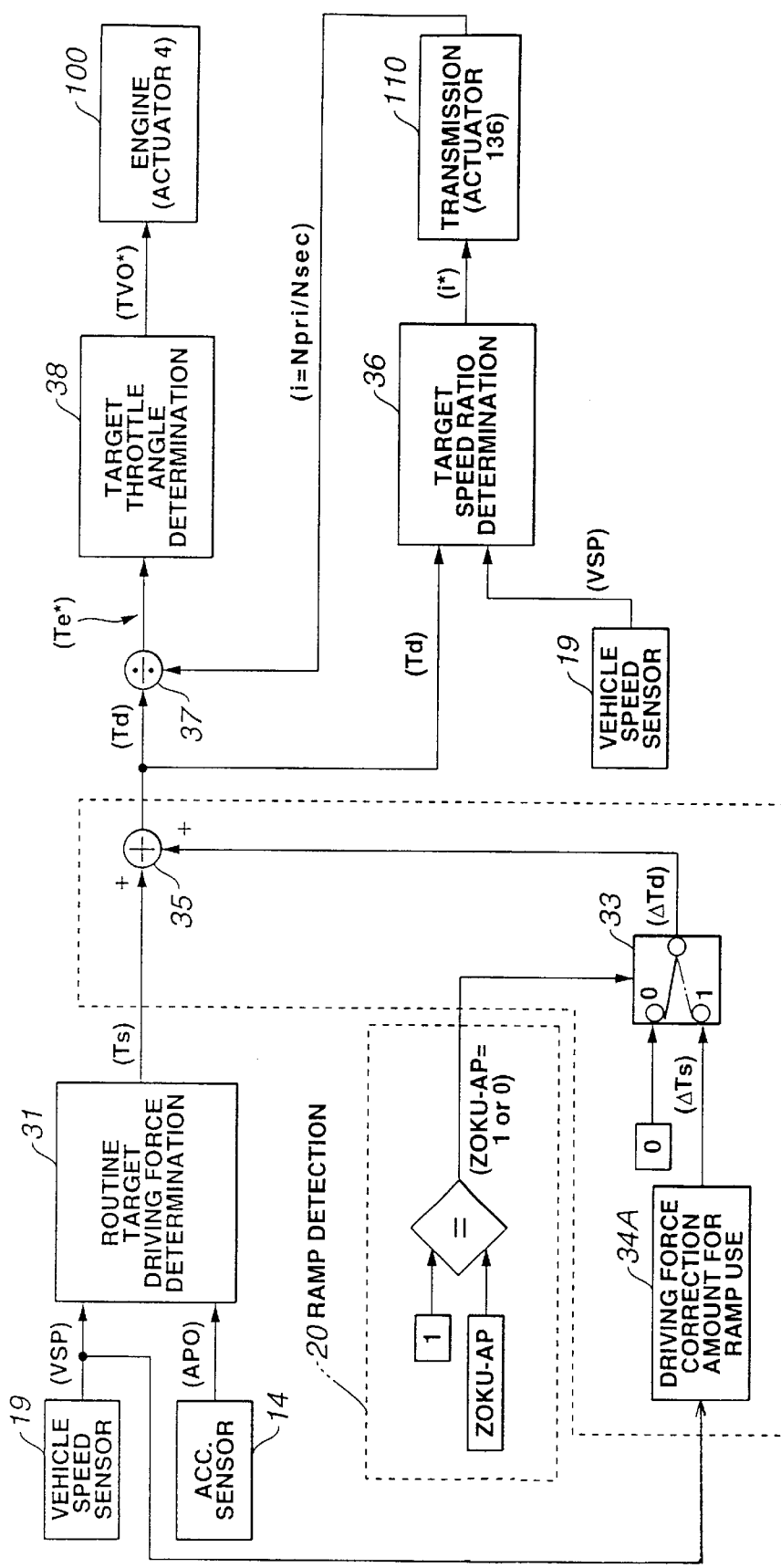
FIG. 7 is a modification of the control diagram of FIG. 6.
Figure 8:
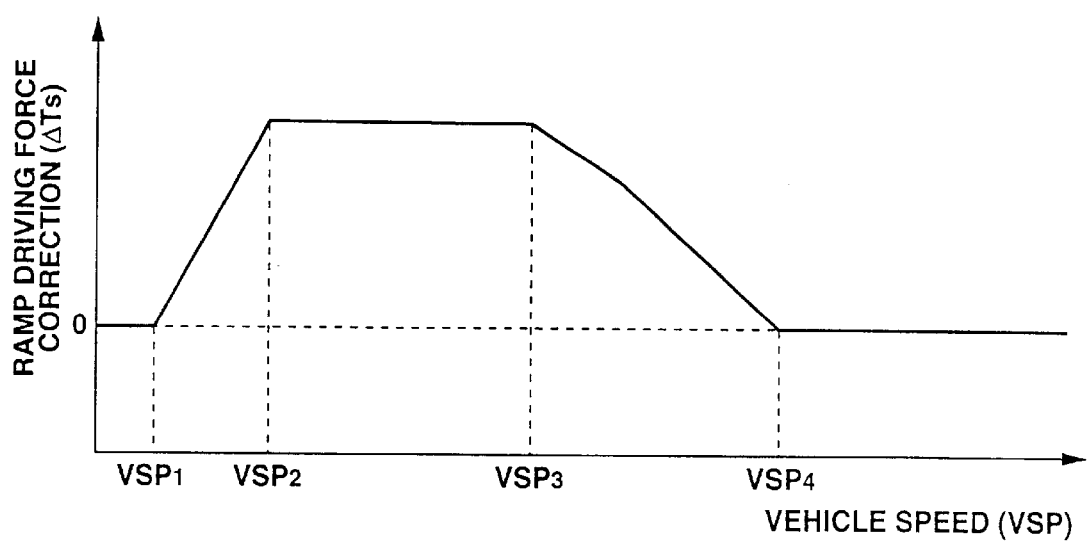
FIG. 8 is a ramp driving force correction variation characteristic against traveling speed of the vehicle.

FIG. 7 illustrates a modification of the control diagram of FIG. 6. FIG. 7 is substantially the same as FIG. 6 except the provision of a modified DFCAFRU generator 34A in lieu of DFCAFRU generator 34. Vehicle speed signal VSP from vehicle speed sensor 19 is fed, as an input, to DFCAFRU generator 34A. DFCAFRU generator 34A may be as simple as a look-up table in the controller memory. The look-up table contains data as illustrated by the fully drawn line in FIG. 8. FIG. 8 shows a ramp driving force correction ($\Delta$Ts) variation characteristic against traveling speed of the vehicle (VSP). As shown in FIG. 8, $\Delta$Ts is zero when VSP is less than $VSP_1$ and greater than $VSP_4$. When VSP is not less than $VSP_2$ and not greater than $VSP_3$, VSP is kept constant and stays at a predetermined value that is greater than zero. The setting is such that $VSP_1 < VSP_2 < VSP_3 < VSP_4$. $VSP_1$ represents an upper limit of an operation range of low vehicle speeds. $VSP_4$ represents a lower limit of an operation range of high vehicle speeds. $VSP_2$ and $VSP_3$ are two values within an operation range of intermediate vehicle speeds. A change in $\Delta$Ts from zero to the predetermined value against variations of VSP from $VSP_1$ to $VSP_2$ is gradual. A change in $\Delta$Ts from the predetermined value to zero against variations of VSP from $VSP_3$ to $VSP_4$ is gradual.

At high vehicle speeds, $\Delta$Ts =0 so that Ts is not increased. This control strategy is advantageous in optimizing driving force at high speeds during traveling on ramp.

The characteristic as illustrated in FIG. 8 is advantageous in avoiding occurrence of a rapid change in driving force because the change in $\Delta$Ts between the predetermined value and zero is gradual.

In the preceding embodiments, driving force command Ts is provided after performing a table look-up operation of fully drawn curves in FIG. 11 against accelerator pedal angle APO and vehicle speed VSP, and it is increased by $\Delta$Ts to give final driving force Td when ramp flag ZOKU-AP is equal to 1. As will be recognized from the fully drawn lines in FIG. 11, there is the trend that increasing in APO will increase Ts. This means that Ts may be used as Td if APO is increased when ramp flag ZOKU-AP is equal to 1.

Figure 9:
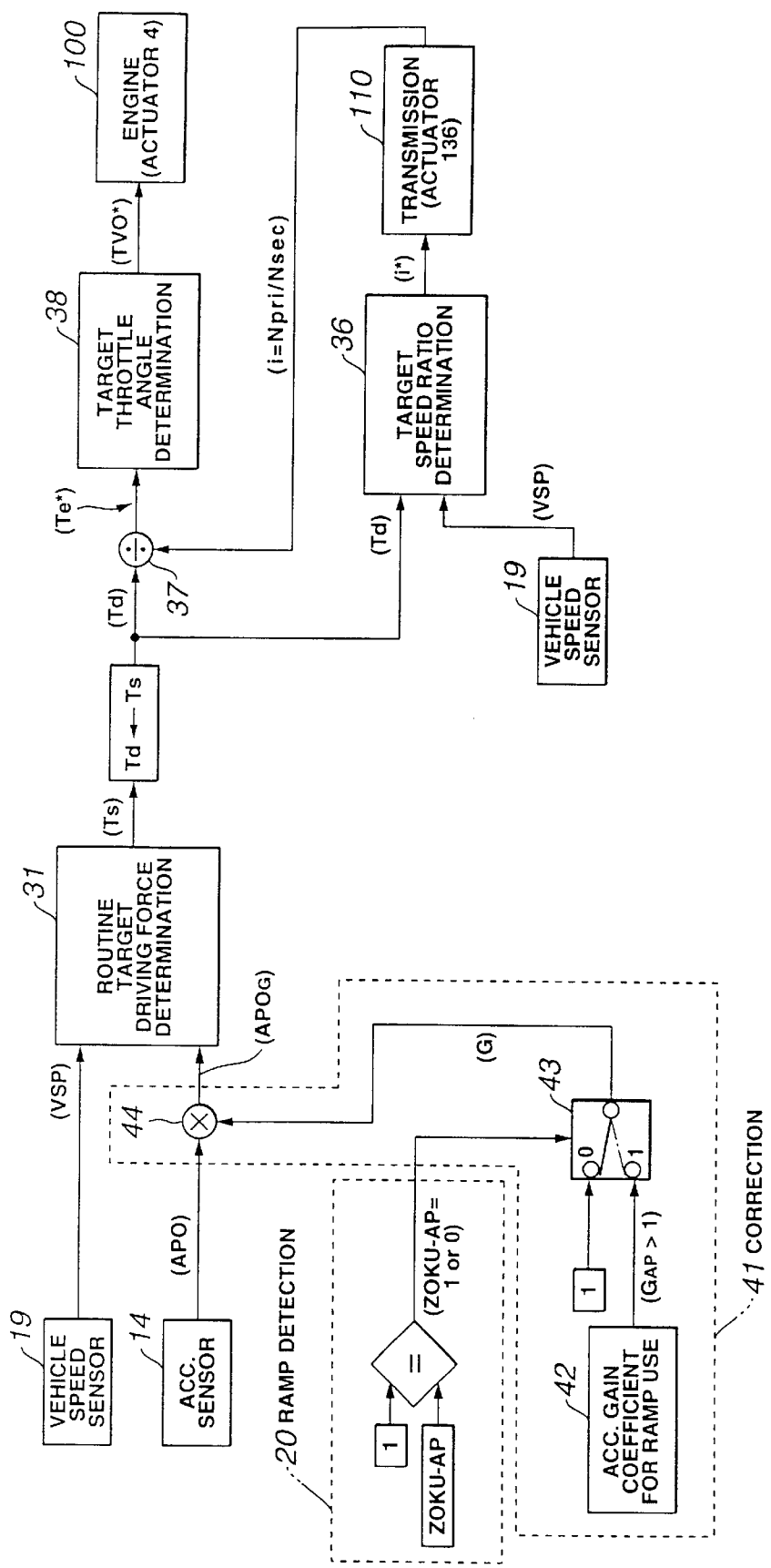
FIG. 9 is another control diagram wherein, instead of correcting the routine target driving force to determine the target driving force, operator demand for driving force is increased and the increased operator demand is used to determine a routine target driving force as a target driving force upon determination that the vehicle is traveling on a ramp.

FIG. 9 is another control diagram implementing the above-mentioned inventive idea. FIG. 9 is substantially the same as FIG. 6 except that correction filter 32 (see FIG. 6) is replaced with a correction filter 41. The correction filter 41 corrects accelerator pedal angle APO to give a corrected accelerator pedal angle $APO_G$. APO from accelerator pedal sensor 14 is fed to a multiplier 44 of the correction filter 41. Also fed to multiplier 44 is a gain signal G from a changeover point 43. An accelerator pedal gain $G_{AP}$ (>1), which is generated by an accelerator gain coefficient for ramp use (AGCFRU) generator 42, is fed, as input, to a "1" input terminal of changeover point 43. A "0" input terminal of changeover point 43 is maintained at a 1 (one) level. Ramp flag ZOKU-AP of ramp detection unit 21 is applied to a bias terminal of changeover point 43. When ZOKU-AP is equal to 0, the "0" input terminal is connected to an output terminal so that output G of changeover point 43 is maintained at 1 level. Under this condition, accelerator pedal angle APO is not corrected and used as $APO_G$. When ZOKU-AP is equal to 1, "1" input terminal is connected to the output terminal so that the output G of changeover point 43 is maintained as high as $G_{AP}$. Under this condition, accelerator pedal angle APO is multiplied with $G_{AP}$ to provide $APO_G$. Expressing mathematically, $APO_G$=APO X $G_{AP}$. It follows that, if ZOKU-AP=0, $APO_G$=APO, while, if ZOKU-AP=1, $APO_G$>APO.

At RTDD generator 31, $APO_G$ is used as APO in performing a table look up operation of the fully drawn lines in FIG. 11. Driving force command Ts resulting from this table look-up operation is used as final driving force Td.

As readily seen from the fully drawn lines in FIG. 11, increasing accelerator pedal angle (APO) will increase driving force (Ts). If it is assumed that $G_{AP}$ is 1.2, a deviation of APO from $APO_G$ can be expressed as APO×0.2. This means that the deviation (APO×0.2) increases as APO increases. The more accelerator pedal is depressed, the more driving force (Td=Ts) is increased.

Figure 10:
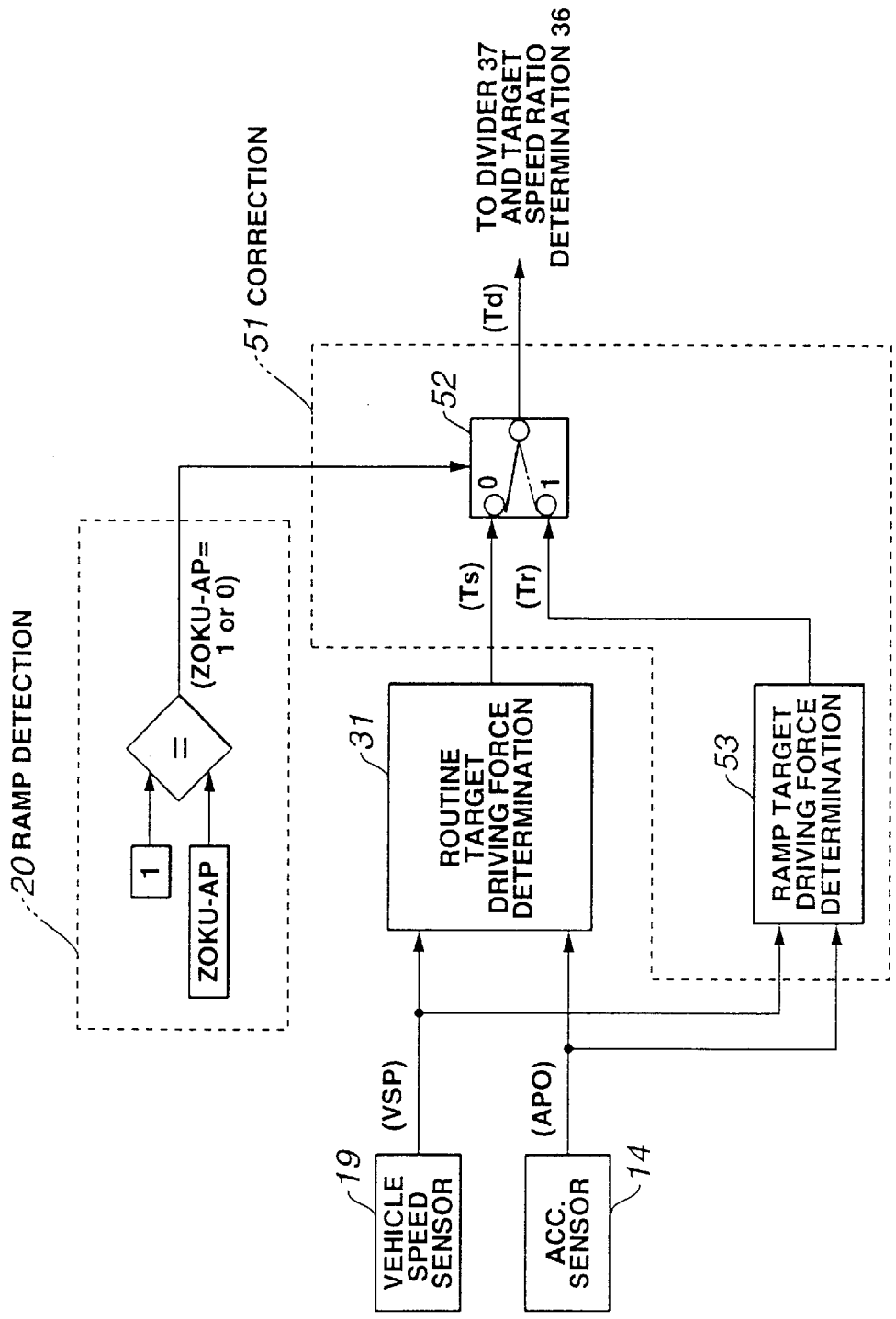
FIG. 10 is still another control diagram wherein, instead of correcting the routine target driving force to determine the target driving force, a set of target values of driving force for traveling on a ramp is prepared and used as a target driving force upon determination that the vehicle is traveling on a ramp.

FIG. 10 is other control diagram implementing other approach to provide increased final driving force Td when ramp flag ZOKU-AP is equal to 1. According to this approach, another set of data is prepared for providing target driving force Tr when ramp flag ZOKU-AP is equal to 1in addition to the data as illustrated by the fully drawn line Ts in FIG. 11. FIG. 10 shows only a modified portion of FIG. 6. As different from FIG. 6, correction filter 32 (see FIG. 6) is replaced with a correction filter 51. Correction filter 51 includes a changeover point 52 and a ramp target driving force determination (RTDFD) generator 53. Routine target driving force Ts from RTDFD generator 31 is fed, as input, to a "0" input terminal of changeover point 52. Ramp target driving force Tr from RTDFD generator 53 is fed, as input, to a "1" input terminal of changeover point 52. Output on an output terminal of changeover point 52 is fed, as final target driving force Td, to divider 37 and TSRD generator 36. Ramp flag ZOKU-AP from ramp detection unit 20 is applied to a bias port of changeover point 52.

When ZOKU-AP is equal to 0, "0" input terminal is connected to output terminal so that final driving force Td is as high as Ts. When ZOKU-AP is equal to 1, "1" input terminal is connected to output terminal so that final driving force Ts is as high as Tr.

Vehicle speed signal VSP and accelerator pedal angle signal APO are fed, as inputs, to RTDFD generator 53. At RTDFD generator 31, a table look-up operation of the fully drawn line curves in FIG. 11 is performed using APO and VSP to provide routine target driving force Ts. At RTDFD generator 53, another table look-up operation of the dotted line curves in FIG. 11 is performed using APO and VSP to provide ramp target driving force Tr.

With the same APO and VSP, ramp target driving force Tr is greater than routine driving force Ts to meet operator demand during travel on a ramp. Experiments conducted determine data of Tr. Alternatively, adding operation of $\Delta$Ts to Ts over various combinations of APO and VSP determines data of Tr. If desired, multiplying operation of $G_{AP}$ with Ts over various combinations of APO and VSP determines data of Tr.

In each of the preceding embodiments, the target driving force (Td) has been altered or increased when ramp flag ZOKU-AP is set (ZOKU-AP =1).

The preceding description relates to various approaches to meet operator power demand during traveling on a ramp. The following description concerns an inventive approach to meet operator deceleration demand during traveling on a ramp.

According to a preferred implementation of the present invention, a vehicle acceleration Vacc is controlled to fall within a ramp target window by varying a speed ratio within the CVT after the vehicle operator has released an accelerator pedal (APO=0). In order to meet operator deceleration demand during traveling on a ramp, the target window is defined by an upper limit $Racc_{ov}$ of −0.03G in this example and a lower limit $Racc_{ud}$ of −0.05G in this example. For traveling on roadways other than a ramp, the target window is defined by an upper limit $Nacc_{ov}$ of +0.02G and a lower limit $Nacc_{ud}$ of 0G. For ease of description, the target window for operation on a ramp is called "ramp target window" and the target window for operation on roadways other than a ramp is called "routine target window" In this implementation, there is a shift in terms of 0.05G in a direction of deceleration from the routine target window to the ramp target window. The amount of shift is determined to meet operator deceleration demand upon traveling into a ramp with accelerator pedal released. Vehicle acceleration Vacc is held within the ramp target window regardless of change in environmental road conditions of a ramp. In other words, this control allows a change in vehicle acceleration Vacc within the ramp target window due to a change in road conditions. Such road condition dependent change in vehicle acceleration meets operator deceleration demand.

In this implementation, the CVT speed ratio control is employed to vary the vehicle acceleration Vacc. Varying the speed ratio is effective to alter vehicle acceleration Vacc under engine braking condition. The effects are a reduction of fuel consumption and a reduction in wear of a foot brake.

This implementation of the present invention may be operable with other measure of altering vehicle acceleration Vacc.

Preferably, the above-mentioned vehicle acceleration control in relation to the ramp target window is prohibited when vehicle speed VSP drops below a predetermined value of 20 km/h in this example even if the vehicle travels on a ramp. This measure prevents occurrence of excessive deceleration upon release of accelerator pedal at low vehicle speed less than the predetermined value.

Figure 13:
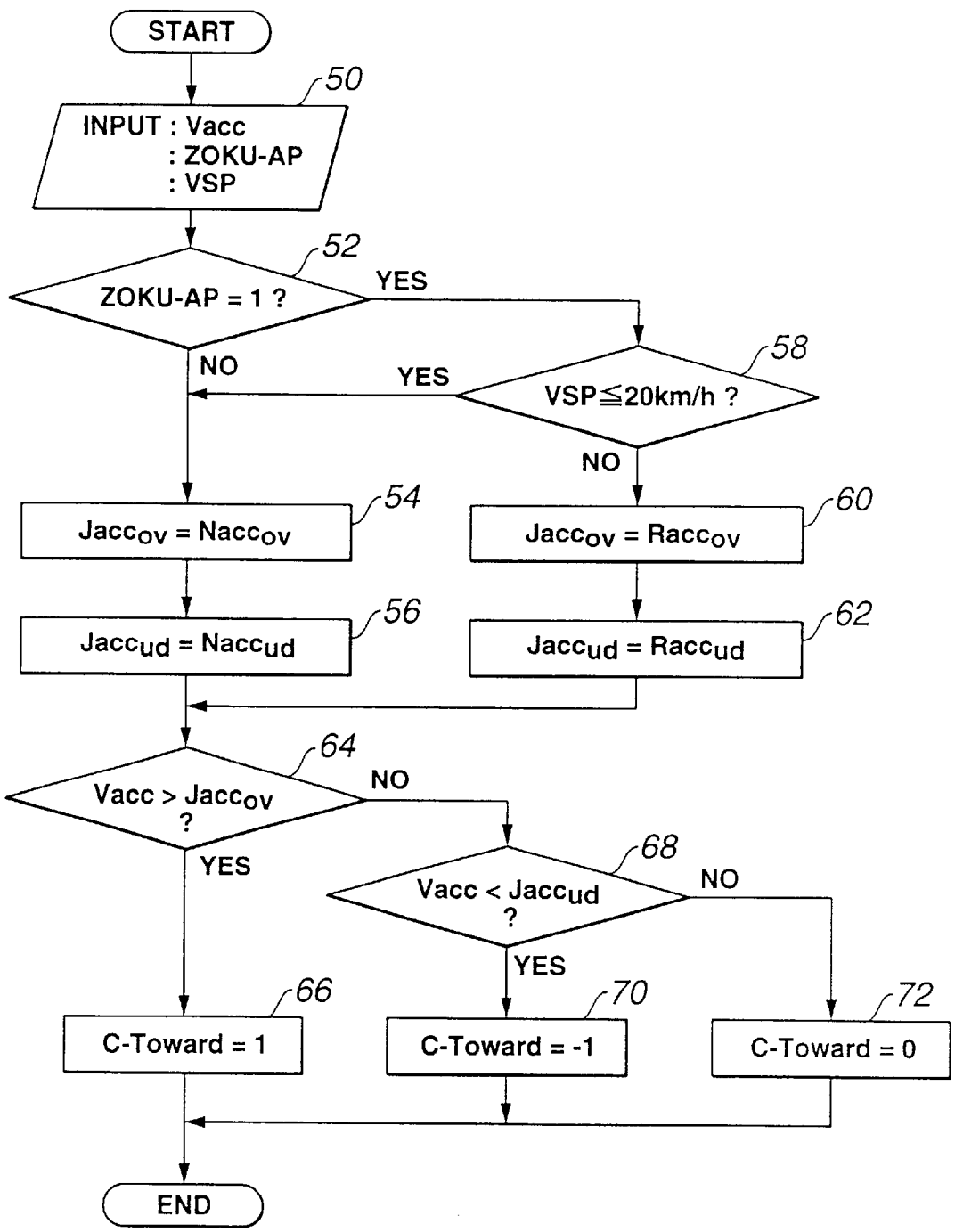
FIG. 13 is a flow chart of a control routine to select one of three different deceleration commands.
Figure 14:
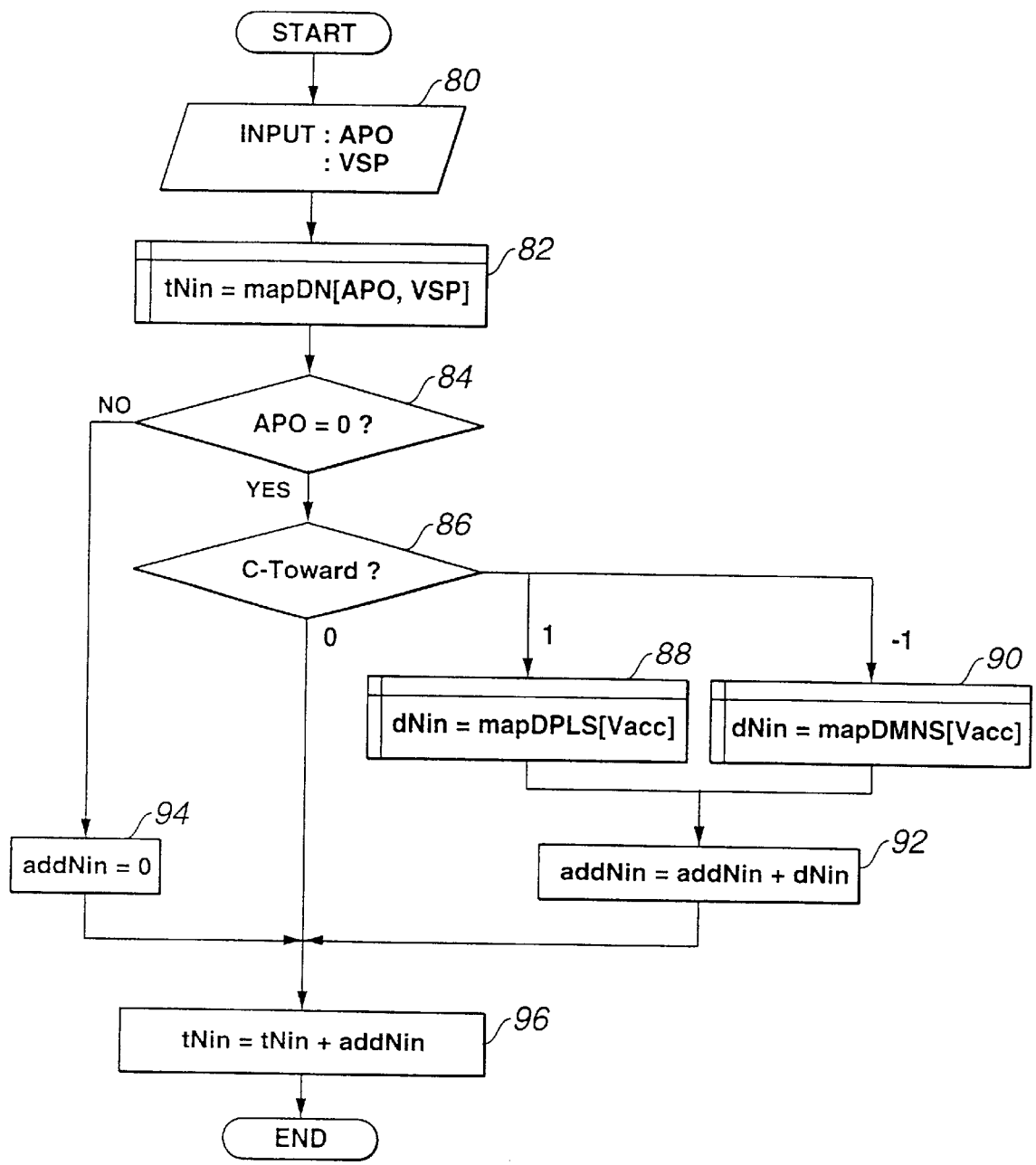
FIG. 14 is a flow chart of a control routine to adjust deceleration by ratio rate control in accordance with the selected deceleration command.

Referring to FIGS. 13 to 17, the charts of FIGS. 13 and 14 illustrate control routines of the preferred implementation of the present invention.

Controller 13 (see FIG. 1) executes these control routines at regular intervals of 10 milliseconds. In FIG. 13, in step 50, controller 13 inputs information as to vehicle acceleration Vacc, ramp flag ZOKU-AP, and vehicle speed VSP.

The controller 13 calculates a change in vehicle speed VSP and regards the result as vehicle acceleration Vacc. 15 In the next step 52, controller 13 determines whether or not ramp flag is set (ZOKU-AP=1). If this is the case, i.e., ZOKU-AP=1, the routine proceeds to step 58. If this is not the case, i.e., ZOKU-AP=0, the routine proceeds to step 54.

In step 58, controller 13 determines whether or not vehicle speed VSP is equal to or less than the predetermined vehicle speed of 20 km/h. If this is the case, i.e., VSP≦20 km/h, the routine proceeds to step 54. If this is not the case, i.e., VSP>20 km/h, the routine proceeds to step 60.

In step 54, controller 13 stores the routine target window upper limit $Nacc_{ov}$, which corresponds to +0.02G, at $Jacc_{ov}$. In the next step 56, controller 13 stores the routine target window lower limit $Nacc_{ud}$, which corresponds to 0G (zero G), at $Jacc_{ud}$.

In step 60, controller 13 stores the ramp target window upper limit $Racc_{ov}$, which corresponds to −0.03G, at $Jacc_{ov}$. In the next step 62, controller 13 stores the ramp target window lower limit $Racc_{ud}$, which corresponds to −0.05G, at $Jacc_{ud}$.

After setting the routine target window at steps 54 and 56 or the ramp target window at steps 60 and 62, the routine proceeds to step 64.

In step 64, controller 13 determines whether or not vehicle acceleration Vacc is greater than $Jacc_{ov}$. If this is the case, controller 13 determines that there is a need to strengthen deceleration and sets "1" at a deceleration command C-Toward in step 66. If this is not the case, i.e., Vacc≦$Jacc_{ov}$, the routine proceeds to step 68. In step 68, controller 13 determines whether or not vehicle acceleration Vacc is less than $Jacc_{ud}$. If this is the case, controller 13 determines that there is a need to weaken deceleration and sets "1" at deceleration command C-Toward in step 70. If this is not the case, i.e., $Jacc_{ov}$ ≧Vacc ≧$Jacc_{ud}$, controller 13 determines that a current state of deceleration be maintained and sets "0" at deceleration command C-Toward in step 72.

Referring to FIG. 14, in step 80, controller 13 inputs information as to accelerator pedal angle APO and vehicle speed VSP.

Figure 15:
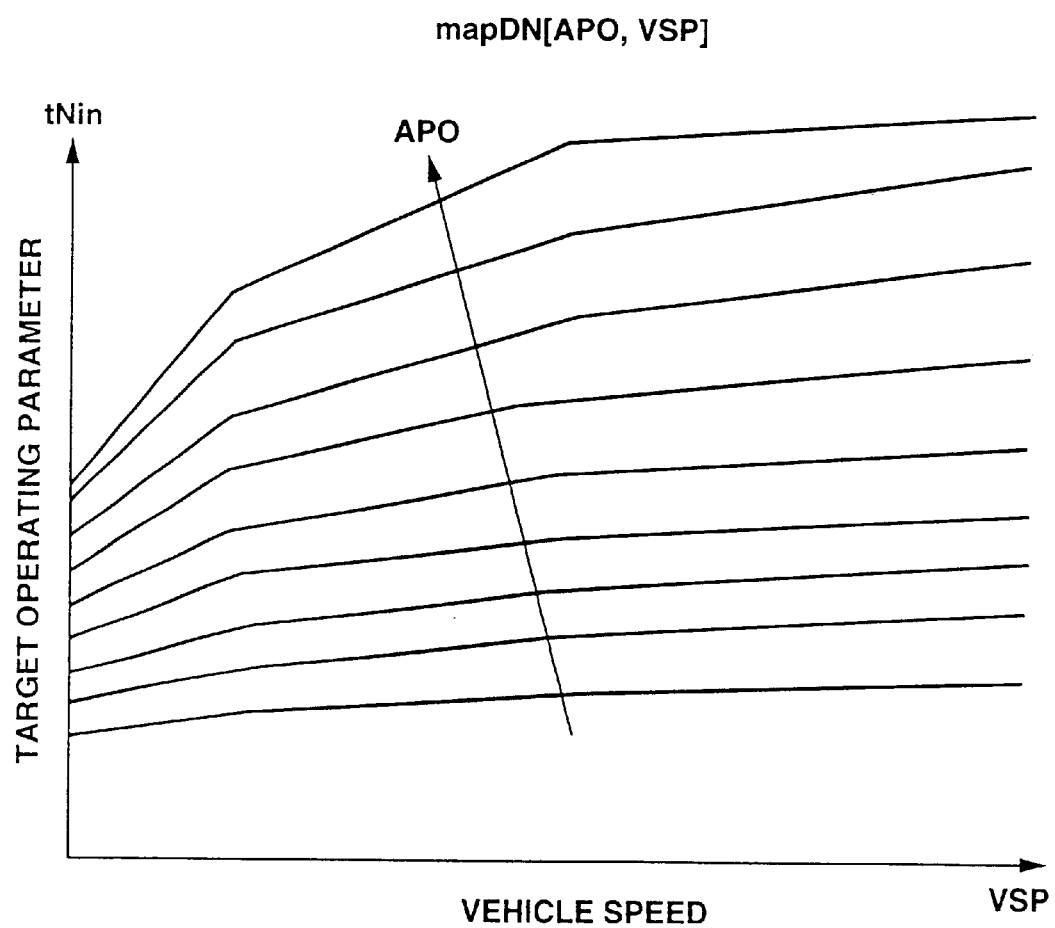
FIG. 15 is a CVT map that defines target operating parameter (target input speed in this example) against input data of traveling speed (VSP) of the vehicle and the accelerator pedal angle (APO).

In the next step 82, controller 13 determines a target input revolution speed tNin by performing a table look-up operation of a map shown in FIG. 15 against APO and VSP. Then, the routine proceeds to step 84.

In step 84, controller 13 determines whether or not accelerator pedal angle APO is equal to 0 (zero). If the accelerator pedal is depressed so that APO is not equal to 0, the routine proceeds to step 94. If the accelerator pedal is released so that APO is equal to 0, the routine proceeds to step 86.

In step 94, controller 13 resets a correction addNin (addNin=0).

In step 86, controller 13 checks the status of deceleration command C-Toward.

If, in step 86, deceleration command C-Toward is "0", the routine proceeds to step 96 without altering the con tent of addNin.

If, in step 86, deceleration command C-Toward is "1", the routine proceeds to step 88. If, in step 86, deceleration command C-Toward is "−1", the routine proceeds to step 90.

Figure 16:
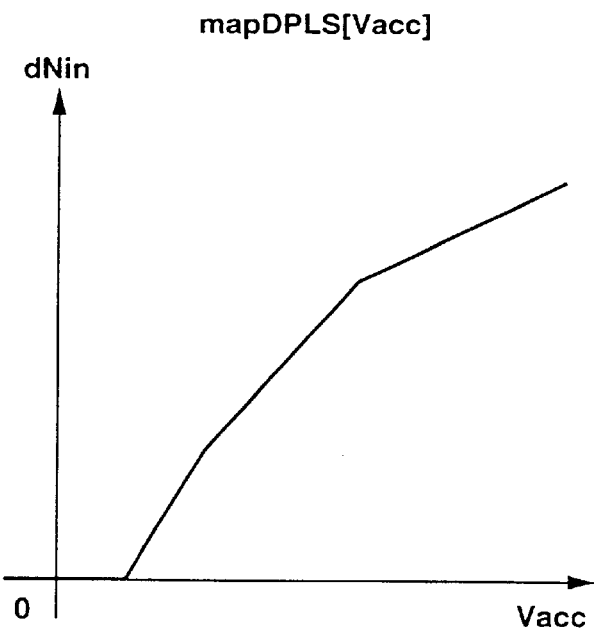
FIG. 16 is a target input speed increment map against variations of vehicle acceleration (Vacc) in response to deceleration command for strong deceleration.

In step 88, controller 13 determines an increment dNin by performing a table look-up operation of a map illustrated in FIG. 16 against vehicle acceleration Vacc. From FIG. 16, it will be seen that the increment dNin is not less than zero and increases above zero as vehicle acceleration Vacc increases beyond zero.

Figure 17:
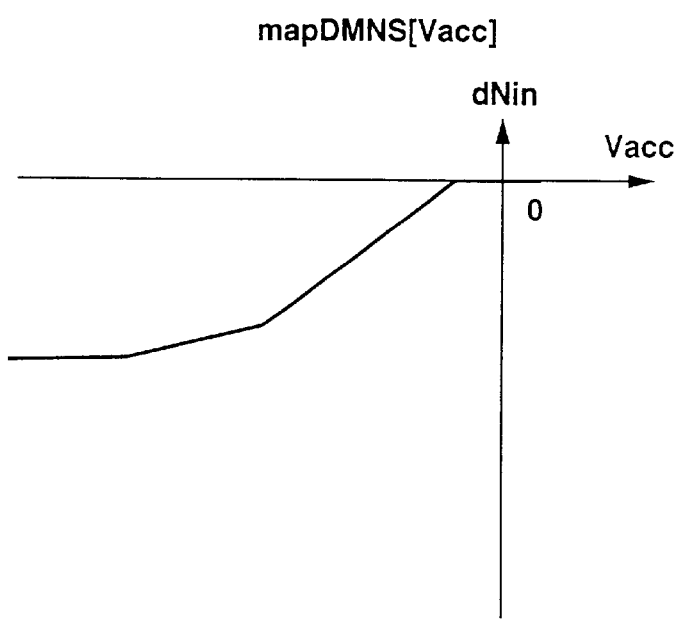
FIG. 17 is a target input speed increment map against variation of vehicle acceleration (Vacc) in response to deceleration command for weak deceleration.

In step 90, controller 13 determines increment dNin by performing a table look-up operation of a map illustrated in FIG. 17 against vehicle acceleration Vacc. From FIG. 17, it will be seen that the increment dNin is not greater than zero and decreases below zero as vehicle acceleration Vacc decreases below zero.

After step 88 or 90, the routine proceeds to step 92. In step 92, controller 13 performs an increment of addNin by dNin. Then, the routine proceeds to step 96.

In step 96, controller 13 performs an increment of target input speed tNin by addNin.

From the preceding description, it will be appreciated that if controller 13 determines that the accelerator pedal is released, the speed ratio of CVT is varied to provide strong vehicle deceleration if C-Toward is equal to "1" or to provide weak vehicle deceleration if C-Toward is equal to "−1".

In the preceding description, approaches to meet operator power demand have been described in connection with FIGS. 1 to 12 and approach to meet operator deceleration demand has been described in connection with FIGS. 13 to 17. It is preferred to implement the approach to operator deceleration demand in an environment where one of the approaches to meet operator power demand is implemented.

While the present invention has been particularly described in conjunction with the preferred implementations, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

The contents of disclosure of Japanese Patent Applications Nos. 11-288318, filed Oct. 8, 1999, and 2000-36270, filed Feb. 15, 2000, are hereby incorporated by reference in their entireties.

What is claimed is:

1. A control system for an engine-transmission powertrain of a vehicle having a transmission to establish various speed ratios between input and output shafts of the transmission, an accelerator pedal with various positions including a released position, and an engine with various output torque levels, the control system comprising:

a vehicle navigation system including a map database with map information including kinds of roadways, said vehicle navigation system being operable to provide information as to a current position of the vehicle and information as to a kind of roadway which the current vehicle position is on;

a ramp detection unit operatively connected with said vehicle navigation system to determine whether or not the vehicle is on a ramp;

an accelerator pedal sensor operatively connected to the accelerator pedal to detect operator demand by detecting current position of the accelerator pedal; and a controller, which receives output signals of said ramp detection unit and said accelerator pedal sensor, and generates a command upon determination by said ramp detection unit that the vehicle is on the ramp and applying said command to the engine transmission powertrain, affecting control of the engine-transmission powertrain to meet the detected operator demand.

2. The control system as claimed in claim 1, wherein said controller commands the engine-transmission powertrain to accomplish a ramp target driving force that has been set for traveling on the ramp to meet operator power demand.

3. The control system as claimed in claim 2, wherein said controller commands the engine-transmission powertrain to accomplish a target window of vehicle acceleration for traveling on the ramp to meet operator deceleration command upon detection by said accelerator pedal sensor that the accelerator pedal is at the released position.

4. The control system as claimed in claim 2, wherein said controller determines a routine target driving force for use in traveling on routine roadways as a function of an accelerator pedal angle of the accelerator pedal, and said controller corrects said routine target driving force to give said ramp target driving force.

5. The control system as claimed in claim 4, wherein said controller increases said routine target driving force to give said ramp target driving force.

6. The control system as claimed in claim 5, wherein said controller calculates a sum of a predetermined value and said routine target driving force to give said ramp target driving force.

7. The control system as claimed in claim 5, wherein said controller provides varying values against various measures of vehicle speed and calculates a sum of one of said varying values and said routine target driving force to give said ramp target driving force.

8. The control system as claimed in claim 5, wherein said controller calculates a product of a predetermined gain greater than one and the accelerator pedal angle and determines said ramp target driving force as a function of said product.

9. The control system as claimed in claim 2, wherein said controller determines a routine target driving force for use in traveling on routine roadways as a first function of an accelerator pedal angle of the accelerator pedal, and said controller determines said ramp target driving force as a second function of the accelerator pedal angle.

10. The control system as claimed in claim 2, wherein at vehicle speeds higher than a predetermined value, said controller prohibits control to accomplish said ramp target driving force.

11. The control system as claimed in claim 1, wherein said controller commands the engine-transmission powertrain to accomplish a ramp target window of vehicle acceleration for traveling on the ramp to meet operator deceleration command upon detection by said accelerator pedal sensor that the accelerator pedal is at the released position.

12. The control system as claimed in claim 11, wherein said controller determines a routine target window for vehicle acceleration, and wherein there is a shift in a direction toward deceleration from said routine target window to said ramp target window.

13. The control system as claimed in claim 12, wherein said shift falls in a range from −0.03G to −0.05G.

14. The control system as claimed in claim 12, wherein said routine target window is defined by a first upper limit of vehicle acceleration and a first lower limit of vehicle acceleration, wherein said ramp target window is defined by a second upper limit of vehicle acceleration and a second lower limit of vehicle acceleration, and wherein said second upper and lower limits are moved in the direction of deceleration from said first upper and lower limits, respectively.

15. The control system as claimed in claim 14, wherein said controller affects ratio control of the speed ratio of the transmission to accomplish one of said routine and ramp target windows.

16. The control system as claimed in claim 15, wherein said controller prohibits the ratio control to accomplish said ramp target window at vehicle speeds less than a predetermined value upon determination by said ramp detector unit that the vehicle is traveling on the ramp.

17. A control method for an engine-transmission powertrain of a vehicle having a transmission to establish various speed ratios between input and output shafts of the transmission, an accelerator pedal with various positions including a released position, and an engine with various output torque levels, the control method comprising:

determining whether or not the vehicle is on a ramp;

detecting operator demand by detecting current position of the accelerator pedal; and generating a command upon determination that the vehicle is on the ramp and applying said command to the engine-transmission powertrain, affecting control of the engine-transmission powertrain to meet the detected operator demand.

18. A control system for an engine-transmission powertrain of a vehicle having a transmission to establish various speed ratios between input and output shafts of the transmission, an accelerator pedal with various positions including a released position, and an engine with various output torque levels, the control system comprising:

means for determining whether or not the vehicle is on a ramp;

means for detecting operator demand by detecting current position of the accelerator pedal; and means for generating a command upon determination that the vehicle is on the ramp and applying said command to the engine-transmission powertrain, affecting control of the engine-transmission powertrain to meet the detected operator demand.

* * * * *